(12) United States Patent
Kim

(10) Patent No.: US 11,096,091 B2
(45) Date of Patent: Aug. 17, 2021

(54) METHOD FOR INTERWORKING BETWEEN HETEROGENEOUS RADIO ACCESS NETWORKS AND APPARATUS THEREFOR

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 128 days.

(21) Appl. No.: 16/092,471

(22) PCT Filed: May 11, 2017

(86) PCT No.: PCT/KR2017/004894
§ 371 (c)(1),
(2) Date: Oct. 10, 2018

(87) PCT Pub. No.: WO2017/196106
PCT Pub. Date: Nov. 16, 2017

(65) Prior Publication Data
US 2019/0132772 A1    May 2, 2019

(30) Foreign Application Priority Data

May 13, 2016    (KR) .................. 10-2016-0059079
Apr. 28, 2017   (KR) .................. 10-2017-0055128

(51) Int. Cl.
*H04W 28/12*     (2009.01)
*H04W 76/15*     (2018.01)
(Continued)

(52) U.S. Cl.
CPC ....... *H04W 28/12* (2013.01); *H04W 28/0252* (2013.01); *H04W 28/0268* (2013.01);
(Continued)

(58) Field of Classification Search
CPC ... H04W 72/042; H04W 76/27; H04W 88/06; H04W 76/15; H04W 36/0055
See application file for complete search history.

(56) References Cited

U.S. PATENT DOCUMENTS

2011/0141890 A1*  6/2011  Giaretta ............. H04L 65/1069
                                                       370/232
2013/0016696 A1   1/2013  Adjakple et al.
(Continued)

FOREIGN PATENT DOCUMENTS

IN    201611012092    *  4/2016
KR    10-2014-0050659 A   4/2014
(Continued)

OTHER PUBLICATIONS

Author Unknown, Consideration on the Interworking between LTE and New RAT, Apr. 15, 2016, pp. 1-3 (Year: 2016).*
(Continued)

*Primary Examiner* — Christopher M Crutchfield
(74) *Attorney, Agent, or Firm* — IP Legal Services, LLC

(57) ABSTRACT

Provided are a method and an apparatus for interworking between 5G and LTE/LTE-advanced radio access networks (RANs). The method may include receiving, by a master base station, a service quality policy from a core network connected to the master base station and a secondary base station, receiving one or more packet flows from the core network; and mapping the packet flows to at least one of radio flows and radio bearers based on the service quality policy.

3 Claims, 7 Drawing Sheets

(51) Int. Cl.
*H04W 76/11* (2018.01)
*H04W 28/02* (2009.01)
*H04W 72/04* (2009.01)
*H04W 88/06* (2009.01)
*H04W 36/00* (2009.01)

(52) U.S. Cl.
CPC ..... *H04W 36/0055* (2013.01); *H04W 72/042* (2013.01); *H04W 76/11* (2018.02); *H04W 76/15* (2018.02); *H04W 88/06* (2013.01)

(56) References Cited

U.S. PATENT DOCUMENTS

| | | |
|---|---|---|
| 2014/0029513 A1 | 1/2014 | Takahashi et al. |
| 2015/0043492 A1 | 2/2015 | Baek et al. |
| 2015/0092707 A1 | 4/2015 | Kwon |
| 2015/0148038 A1* | 5/2015 | Griot ............... H04W 8/18 455/435.3 |
| 2015/0181473 A1 | 6/2015 | Horn et al. |
| 2015/0257159 A1* | 9/2015 | Speicher ............ H04W 28/10 370/235 |
| 2015/0358866 A1 | 12/2015 | Xu et al. |
| 2016/0057687 A1 | 2/2016 | Horn et al. |
| 2016/0164793 A1 | 6/2016 | Basu Mallick et al. |
| 2016/0234714 A1 | 8/2016 | Basu Mallick et al. |
| 2016/0269241 A1* | 9/2016 | Zhang ............... H04L 41/0846 |
| 2016/0338139 A1 | 11/2016 | Kwon |
| 2017/0048751 A1 | 2/2017 | Rasanen |
| 2017/0078911 A1* | 3/2017 | Jeong ............... H04W 8/02 |
| 2017/0149546 A1* | 5/2017 | Zhang ............... H04W 72/0453 |
| 2017/0332272 A1 | 11/2017 | Adjakple et al. |
| 2018/0139646 A1 | 5/2018 | Basu Mallick et al. |
| 2018/0205661 A1 | 7/2018 | Basu Mallick et al. |
| 2018/0242209 A1 | 8/2018 | Xu et al. |
| 2018/0302945 A1 | 10/2018 | Kwon |
| 2019/0132713 A1* | 5/2019 | Xu ............... H04M 15/73 |
| 2019/0363992 A1 | 11/2019 | Basu Mallick et al. |
| 2020/0107385 A1 | 4/2020 | Adjakple et al. |

FOREIGN PATENT DOCUMENTS

| | | |
|---|---|---|
| KR | 10-2015-0020510 A | 2/2015 |
| KR | 10-2015-0035358 A | 4/2015 |
| KR | 10-2015-0096499 A | 8/2015 |
| KR | 10-2016-0034911 A | 3/2016 |
| WO | 2015/045268 A1 | 4/2015 |
| WO | 2015/165540 A1 | 11/2015 |

OTHER PUBLICATIONS

Author Unknown, consideration on RAN architecture in 5G NR, Apr. 15, 2016, pp. 1-4 (Year: 2016).*

Author Unknown, Interworking between LTE and 5G Nr, Doc. No. R3-160777, Apr. 15, 2016, pp. 1-4 (Year: 2016).*

Author Unknown, LTE QoS: SDF and EPS Bearer QoS, Sep. 11, 2013, pp. 1-9 (Year: 2013).*

Author Unknown, Discussion on the QoS control in the NextGen RAN, pp. 1-5, Apr. 15, 2016 (Year: 2016).*

Salah Eddine El Ayoubi et al., "Preliminary Views and Initial Considerations on 5G RAN Architecture and Functional Design", 5G PPP, White Paper, Mar. 8, 2016, pp. 1-27.

H2020-ICT-671650-mmMAGIC /D3.1, "Project Name: Millimetre-Wave Based Mobile Radio Access Network for Fifth Generation Integrated Communications (mmMAGIC)", Initial concepts on 5G architecture and integration, Mar. 31, 2016.

* cited by examiner

METHOD FOR INTERWORKING BETWEEN HETEROGENEOUS RADIO ACCESS NETWORKS AND APPARATUS THEREFOR

CROSS REFERENCE TO RELATED APPLICATIONS

This application is a National Stage Patent Application of PCT International Patent Application No. PCT/KR2017/004894 (filed on May 11, 2017) under 35 U.S.C. § 371, which claims priority to Korean Patent Application Nos. 10-2016-0059079 (filed on May 13, 2016), and 10-2017-0055128 (filed on Apr. 28, 2017), the teachings of which are incorporated herein in their entireties by reference.

TECHNICAL FIELD

Embodiments relate to a method and apparatus for interworking between heterogeneous radio access networks, and a method and apparatus for interworking between 5G and LTE/LTE-Advanced radio access networks.

BACKGROUND ART

A typical long term evolution (LTE)/LTE-Advanced radio access network performs Quality of Service (QoS) control at a bearer level using an evolved packet system (EPS) bearer as the basic unit. Accordingly, several traffic flows are mapped to an EPS bearer in a core network, and a QoS parameter at a corresponding bearer level is assigned to a radio access network. Therefore, the radio access network performs radio bearer control and QoS control at the corresponding level.

Meanwhile, it is expected that 5G will introduce network slicing based flow-based packet control for controlling packet flows at a bearer level more minutely than the typical QoS control. Through such network slicing based flow-based packet control, it may be possible to more flexibly and finely provide various services each requiring different speeds, reliabilities, latencies, and QoS characteristics.

However, flow control is not sufficiently considered in designing of interworking between 5G and LTE/LTE-Advanced base stations. Especially at an early stage of 5G, it is important to provide natural and smooth interworking processes between a 5G radio access network and a typical LTE/LTE-advanced radio access network to provide a stable service.

DETAILED DESCRIPTION OF THE INVENTION

Technical Problem

The present disclosure provides a method and apparatus for interworking between 5G and an LTE/LTE-Advanced radio access networks in order to provide packet flow based QoS control.

Technical Solution

According to an aspect of the present disclosure, a method may be provided for interaction between heterogeneous radio access networks. The method includes: receiving a service quality policy from a core network connected to a master base station and a secondary base station, by the master base station; receiving one or more packet flows from the core network; and mapping the packet flows to at least one of radio flows and radio bearers based on the service quality policy.

According to another aspect of the present disclosure, a method may be provided for interaction between heterogeneous radio access networks. The method includes: transmitting a packet flow to a core network by a terminal; receiving a message from one of a master base station and a secondary base station, which performed mapping between the packet flow and a radio bearer based on a flow identifier assigned by the core network; and transmitting a message including the flow identifier and a bearer identifier to the core network.

According to still another aspect of the present disclosure, a method may be provided for interaction between heterogeneous radio access networks. The method may include: transmitting a connection request message to a core network by a terminal to be connected to a master base station; receiving a connection resetting message from a secondary base station that has performed mapping between a flow and a radio bearer based on a flow identifier assigned by the core network; and transmitting a connection resetting completion message to the secondary base station.

Advantageous Effects

According to the present disclosure, it is possible to more flexibly and finely provide services having various requirements and QoS characteristics of 5G by providing flow packet based interaction processes between 5G and LTE/LTE-advanced base stations.

Further, by efficient interworking between 5G and LTE/LTE-Advanced base stations, it is also possible to provide a more stable connection and to reduce the construction and operation cost by providing efficient interaction processes between 5G and LTE/LTE-Advanced base stations.

MODE FOR CARRYING OUT THE INVENTION

Figure 1:
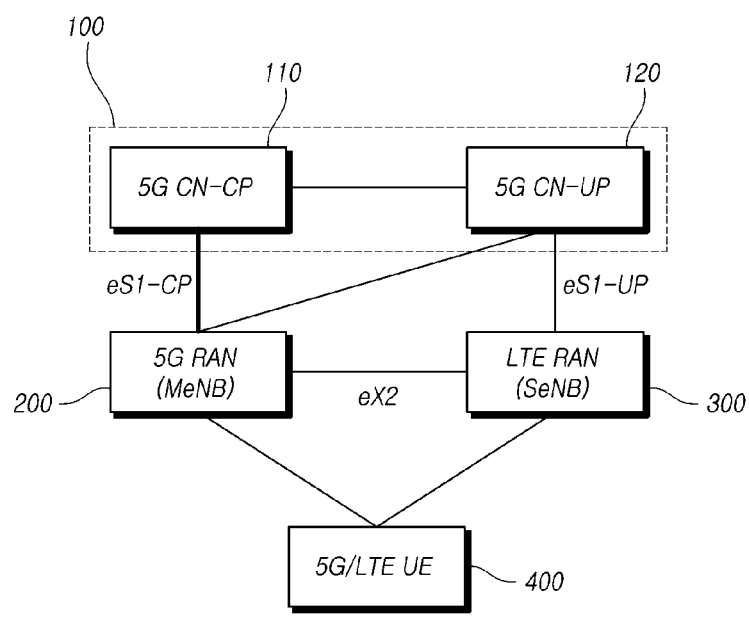
FIG. 1 is a diagram showing a heterogeneous network structure formed of a 5G network and a LTE/LTE-Advanced network and having a 5G radio access network as a master base station.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways. i) the base station may be a device that provides a megacell, a macrocell, a microcell, a picocell, a femtocell, and a small cell in association with a wireless area, or ii) the base station may indicate a wireless area itself. In i), the base station may be a) all devices that interact with one another and controlled by an identical entity to provide a predetermined wireless area or b) all devices that cooperate with each other to configure the wireless area. Based on a configuration type of a wireless area, an eNB, an RRH, an antenna, an RU, a Low Power Node (LPN), a point, a transmission/reception point, a transmission point, a reception point, and the like may be embodiments of a base station. In ii), the base station may be a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) may refer data transmission and reception from a UE to a base station. Downlink (DL) may refer data transmission and reception from a base station to a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field and may include all technical fields in which the technical idea of the present disclosure is applicable.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, a related standard for a system such as LTE and LTE-A may define to configure can uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and downlink may transmit data information through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, signal transmission and reception through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" may include same meaning of "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The background technology of the present disclosure is a 5G network, radio flow control, a radio access network, and interworking between 5G and LTE/LTE-Advanced networks.

It is expected that 5G will introduce network slicing based flow-based packet control for controlling packet flows at a bearer level more minutely than the typical QoS control. Through such network slicing based flow-based packet control, it may be possible to more flexibly and finely provide various services each requiring different speeds, reliabilities, latencies, and QoS characteristics. However, flow control is not sufficiently considered in designing of interworking between 5G and LTE/LTE-Advanced base stations. Especially at an early stage of 5G, it is important to provide natural and smooth interworking processes between a 5G radio access network and a typical LTE/LTE-advanced radio access network to provide a stable service.

According to embodiments of the present disclosure, a method and apparatus may be provided for interworking processes between 5G and LTE/LTE-Advanced radio access networks in a 5G network in order to perform QoS control based on a packet flow.

A 5G network includes a Core Network (CN) and a Radio Access Network (RAN). For convenience of description and ease of understand, it is assumed that a terminal is a dual mode terminal capable of connecting to both of a 5G base station and a LTE/LTE-Advanced base station.

A 5G CN has a Control Plane (CP) configured by a 5G CN-CP entity and a User Plane (UP) configured by a 5G CN-UP entity. The 5G CN-CP entity and the 5G CN-UP entity are connected through interfaces that are defined and implemented by manufacturers or related standards.

For convenience of description and ease of understanding, it is assumed that the 5G core network supports both of a 5G base station and a LTE (or advanced LTE) base station. The interface between the 5G core network and a 5G/LTE/LTE-Advanced radio access network is operated by Enhanced S1 (eS1).

A 5G base station or an LTE/LTE-Advanced base station may be a master base station, depending on the scenarios of constructing a radio access network. The master base station is connected to the 5G CN-CP entity through an eS1-CP interface and, the mater base station and a secondary base station are both connected to the 5G CN-UP entity through an eS1-UP interface.

Figure 2:
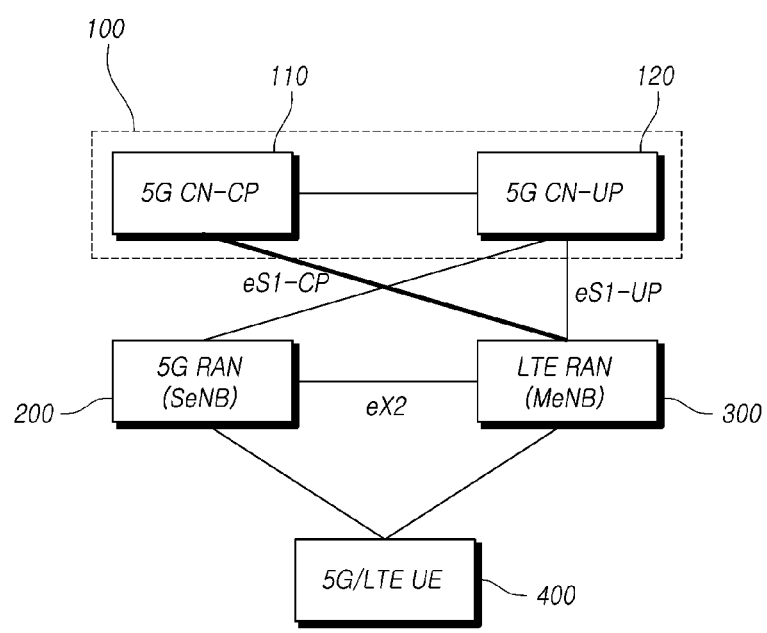
FIG. 2 is a diagram showing a heterogeneous network structure formed of a 5G network and a LTE/LTE-Advanced network and having a LTE/LTE-Advanced radio access network as a master base station.

FIG. 1 shows a 5G radio access network operating as a master base station in a non-standalone interworking structure of a 5G network and a LTE/LTE-Advanced network and, and FIG. 2 shows a LTE/LTE-Advanced radio access network operating as a master base station in a non-standalone interworking structure of a 5G network and a LTE/LTE-Advanced network.

Several packet flows according to various services are transmitted to a 5G core network 100 from a packet data network (PDN).

A 5G CN-CP entity 110 creates and stores a QoS policy and transmits it to a 5G CN-UP entity 120 and a master base station.

It is assumed that a 5G radio access network and a LTE/LTE-advanced radio access network support at least one of 1) radio bearer level control, 2) radio flow level control, and 3) both of the radio bearer level control and the radio flow level control.

1) when a radio access network supports radio bearer level control:

A master base station may 1) create (if necessary) a new radio flow by combining a plurality of flows received from the 5G core network 100 and 2) perform mapping, converting, creating between a radio flow and a radio bearer.

2) when a radio access network supports radio flow level control:

A master base station may 1) create (if necessary) a new radio flow by combining a plurality of flows received from the 5G core network, 2) map and create a core network flow to a radio flow, and 3) determine priorities of radio flows. In particular, higher priorities are given to more important flows such as an RRC signaling message.

Figure 3:
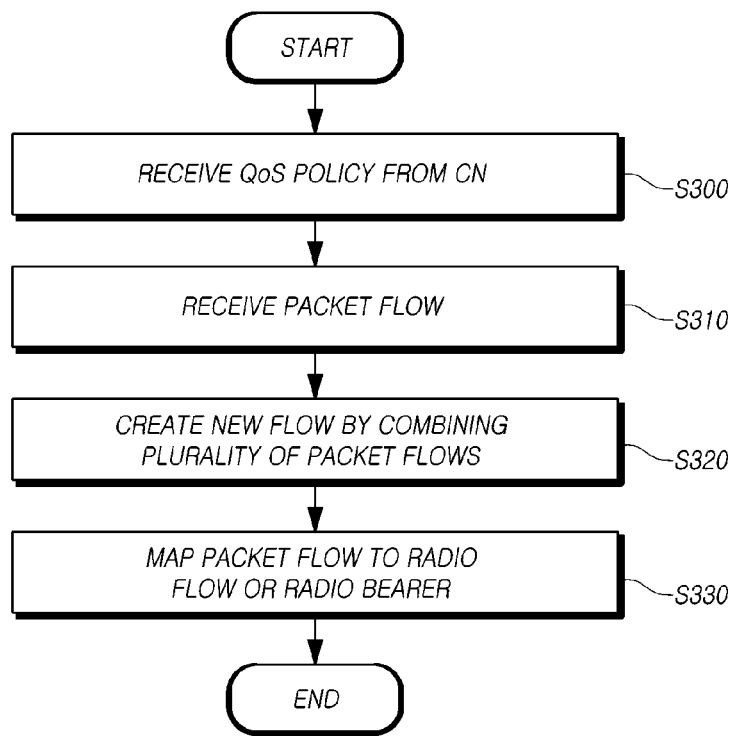
FIG. 3 is a flowchart showing an interworking method between heterogeneous radio access networks according to embodiments.

FIG. 3 is a flowchart showing an interworking method between 5G and LTE/LTE-Advanced radio access networks according to embodiments.

Referring to FIG. 3, a mater base station of the 5G radio access network 200 and the LTE/LTE-Advanced radio access network 300 receives a QoS policy from the 5G core network 100 (S300).

The master base station receives packet flows from the 5G core network 100 (S310) and creates a new flow by combining the received packet flows, if necessary, (S320).

The master base station maps the packet flows to radio flows or radio bearers on the basis of the QoS policy received from the 5G core network 100 (S330) and perform a radio flow level control or a radio bearer level control.

The master base station may transmit flow identifiers assigned by the 5G core network 100 to a terminal 400. The terminal 400 may transmit a message including the flow identifiers and bearer identifiers to the 5G core network 100.

Further, a process of setting and requesting a QoS polity among the 5G core network 100, the master base station, the secondary base station, and the terminal may be performed.

According to the above embodiments of the present disclosure it is possible to perform packet flow based interworking between the 5G radio access network 200 and the LTE/LTE-Advanced radio access network 300. Accordingly, it is possible to more flexibly and finely provide various services each having different requirements and QoS characteristics of 5G.

Mapping of a packet flow may be performed in two steps including i) mapping to a radio flow and ii) mapping to a radio bearer.

Figure 4:
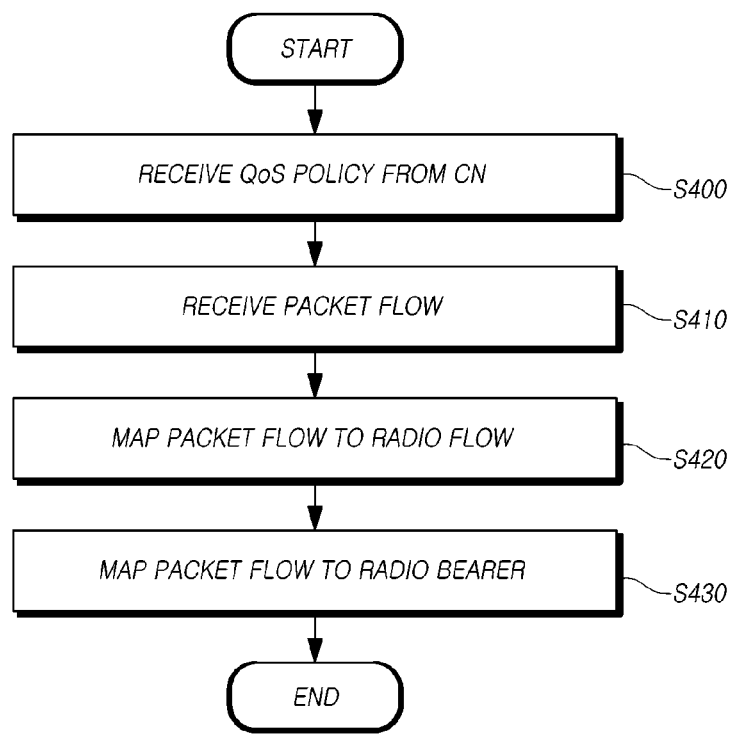
FIG. 4 is a flowchart showing an interworking method between heterogeneous radio access networks according to another embodiments.

FIG. 4 is a flowchart showing an interworking method between 5G and LTE/LTE-Advanced radio access networks according to another embodiments.

Referring to FIG. 4, a mater base station of the 5G radio access network 200 and the LTE/LTE-Advanced radio access network 300 receives a QoS policy from the 5G core network 100 (S400).

The master base station receives packet flows from the 5G core network 100 (S410).

The master base station maps the packet flows received from the 5G core network 100 to radio flows on the basis of a QoS policy (S420) and maps the radio flows to radio bearers (S430).

The 5G core network 100 may map a packet flow received from a terminal to a radio flow, and the master base station may map the radio flow mapped by the 5G core network 100 to a radio bearer.

The 5G core network 100 may assign flow identifiers. The assigned flow identifiers may be transmitted to the terminal by the master base station. Further, the terminal 400 may transmit a message including the flow identifiers and bearer identifiers to the 5G core network 100.

Further, a process of setting and requesting a QoS polity among the 5G core network 100, the master base station, the secondary base station, and the terminal may be performed.

According to the above embodiments of the present disclosure, it is possible to perform stable interworking between the 5G radio access network 200 and the LTE/LTE-Advanced radio access network 300 through packet flow control. Accordingly, it is also possible to flexibly and finely provide various services each having different QoS characteristics.

Figure 5:
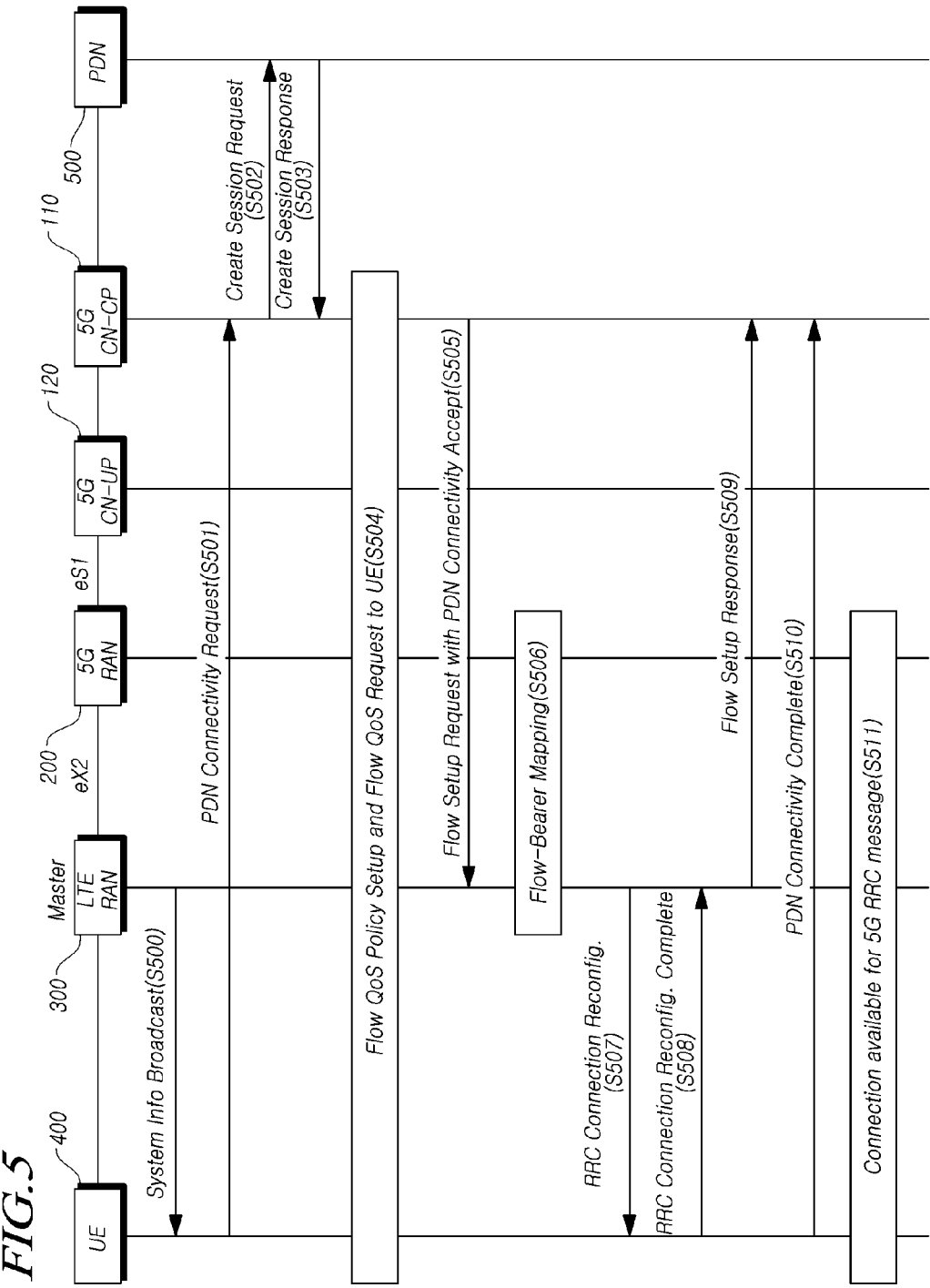
FIG. 5 is a signal flowchart showing a method of setting initial connection between heterogeneous radio access networks according to embodiments.

FIG. 5 is a signal flowchart showing a method of setting initial connection between a 5G radio access network and a LTE/LTE-Advanced radio access network according to embodiments.

Referring to FIG. 5, in a non-standalone interworking scenario between the 5G radio access network 200 and an LTE/LTE-Advanced radio access network 300, the method of setting 5G RRC initial connection may include transmitting, by the terminal 400, 5G RRC signaling through the LTE/LTE-Advanced base station 300. The method of setting initial connection will be described in detail, hereinafter.

1. The LTE/LTE-Advanced base station 300 broadcasts and transmits system information to the terminal 400 (S500).

2. The terminal 400 transmits a message of PDN Connectivity Request to the 5G CN-CP 110 (S501). The terminal 400 requests a dedicated flow for 5G RRC connection. Flows may be classified in detail in accordance with the purposes of use and properties (e.g., into a signaling flow, an MBB data flow, a URLLC data flow, and an mMTC data flow).

3. The 5G CN-CP 110 assigns flow IDs and transmits a message of Create Session Request to the PDN 500 (S502).

4. The PDN 500 responds to the 5G CN-CP 110 with a message of Create Session Response (S503).

5. A procedure of setting and requesting a flow QoS policy among the 5G CN-CP 110, 5G CN-UP 120, RANs 200 and 300, and terminal 400 is performed (S504).

6. The 5G CN-CP 110 transmits a message of Flow Setup Request with the message of Connectivity Accept to the terminal 400 (S505).

7. The LTE/LTE-Advanced and 5G radio access networks performs a mapping and converting procedure between a flow and a radio bearer, if necessary, in accordance with a supportable QoS control method (S506).

8. The LTE/LTE-Advanced base station 300 transmits RRC connection reconfiguration with a message of PDN Connectivity Accept to the terminal 400 (S507).

9. The terminal 400 transmits RRC Connection Reconfiguration Complete to the LTE/LTE-Advanced base station 300 (S508).

10. The LTE/LTE-Advanced base station 300 transmits a message of Flow Setup Response to the 5G CN-CP 110 (S509).

11. The terminal configures a bearer identifier Bearer ID and a flow identifier Flow ID and transmits a message of PDN Connectivity Complete to the 5G CN-CP 110 (S510).

12. When the terminal 400 acquires PDN address information, the terminal 400 transmits a 5G RRC message to the 5G base station 200 through the LTE/LTE-Advanced base station 300 (S511).

According to the above embodiments of the present disclosure it is possible to perform packet flow based interworking between the 5G radio access network 200 and the LTE/LTE-Advanced radio access network 300. Accordingly, it is possible to more flexibly and finely provide various services each having different requirements and QoS characteristics of 5G. Further, it is possible to perform efficient interworking between 5G and LTE/LTE-Advanced base stations according to the embodiments. Accordingly, more stable connection may be provided, and the costs for construction/operation may be reduced.

Figure 6:
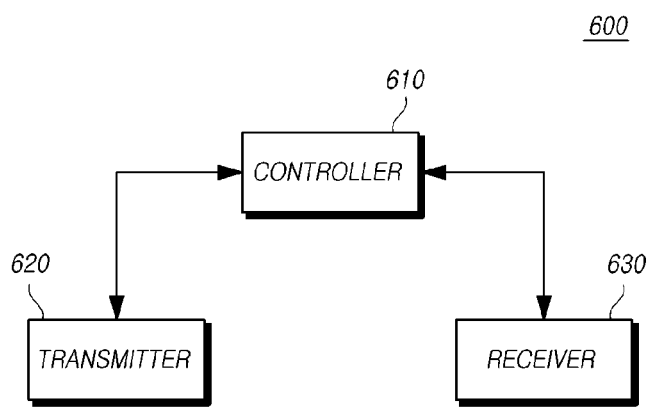
FIG. 6 is a diagram showing a base station according to embodiments.

FIG. 6 shows a base station 600 according to embodiments.

Referring to FIG. 6, the base station 600 according to embodiments includes a controller 610, a transmitter 620, and a receiver 630.

The controller 610 controls the general operation of the base station 600 for more flexibly and finely providing services each having different requirements and QoS characteristics of 5G through interworking between 5G and LTE/LTE-Advanced base stations based on flow packet control.

The transmitter 620 and the receiver 630 are used to transmit/receive signals or messages, and data for achieving the method and system of the present disclosure to/from a terminal.

Figure 7:
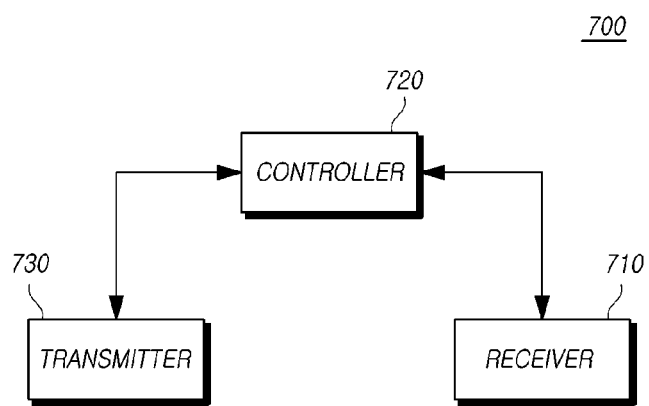
FIG. 7 is a diagram showing a user terminal according to embodiments.

FIG. 7 shows a user terminal 700 according to embodiments.

Referring to FIG. 7, the user terminal 700 according to embodiments includes a receiver 710, a controller 720, and a transmitter 730.

The receiver 710 receives downlink control information, data, and messages from a base station through a corresponding channel.

The controller 720 controls the general operation of the user terminal 700 for more flexibly and finely providing services each having different requirements and QoS characteristics of 5G through interworking between 5G and LTE/LTE-Advanced base stations based on flow packet control.

The transmitter 730 transmits uplink control information, data, and messages to a base station through a corresponding channel.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of setting initial connection for interworking between heterogeneous radio access networks, the method comprising:
    transmitting a connection request message to a core network by a terminal to be connected to a master base station;
    receiving a connection resetting message from a secondary base station that has performed mapping between a flow and a radio bearer based on a flow identifier assigned by the core network, wherein one of the master base station and the secondary base station comprises a 5G radio access network, and wherein the other one of the master base station and the secondary base station comprises an LTE or LTE-Advanced (LTE-A) radio access network; and
    transmitting a connection resetting completion message to the secondary base station, wherein the connection request message, the connection resetting message, and the connection resetting completion message are transmitted by 5G radio resource control (RRC) information to the core network, the master base station, and the secondary base station through the LTE or LTE-A radio access network.

2. The method of claim 1, wherein the master base station and the secondary base station map the flow to a radio flow and map the radio flow to the radio bearer.

3. The method of claim 1, further comprising transmitting a message including the flow identifier and a bearer identifier to the core network.

* * * * *